United States Patent [19]

Guiler

[11] Patent Number: 5,127,687
[45] Date of Patent: Jul. 7, 1992

[54] TAMPER INDICATOR FOR A LOCKING SEAL

[75] Inventor: Richard Guiler, Newton, N.J.
[73] Assignee: E. J. Brooks Co., Newark, N.J.
[21] Appl. No.: 600,002
[22] Filed: Oct. 17, 1990
[51] Int. Cl.⁵ .............................................. B65D 33/34
[52] U.S. Cl. .................................................. 292/327
[58] Field of Search ............. 292/307, 318, 320, 313, 292/319, 326, 327

[56] References Cited

U.S. PATENT DOCUMENTS

| | | | |
|---|---|---|---|
| 409,034 | 8/1889 | Gillespie | 292/327 |
| 4,500,124 | 2/1985 | Swift | 292/318 |
| 4,802,700 | 2/1989 | Stevenson et al. | 292/327 |

FOREIGN PATENT DOCUMENTS 107771  11/1927  Austria .................. 292/327

*Primary Examiner*—Richard E. Moore
*Attorney, Agent, or Firm*—J. D. Kaufmann

[57] ABSTRACT

A tamper-indicating seal of the type having a bolt retained in a lock body, wherein the lock body is surrounded by a shroud of frangible, brittle material and provided with a grooved outer surface and flanged entrance way for receiving and surrounding the bolt end, whereby the shroud is easily fractured, thus providing visual indication of tampering. Visual detection of tampering may be enhanced by a coating applied to the outer surface of the shroud. A surface feature on the between its point of entry into the lock body and its point of entry into the flange is in interfering relationship with a surface feature within the flange, so that an attempted removal of the lock body from the shroud is indicated by cracking, chipping, or fracturing of the flange or the shroud.

19 Claims, 1 Drawing Sheet

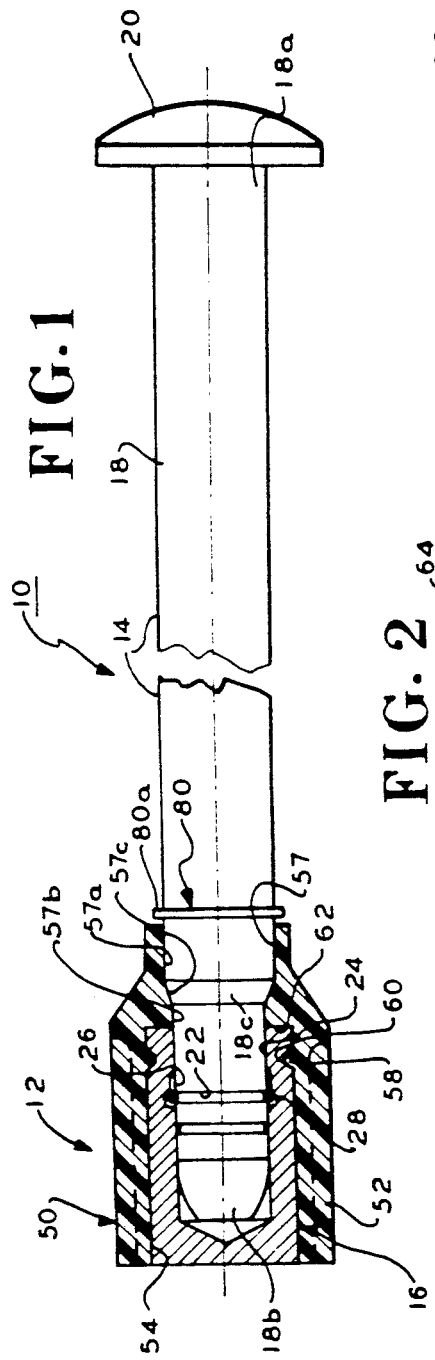
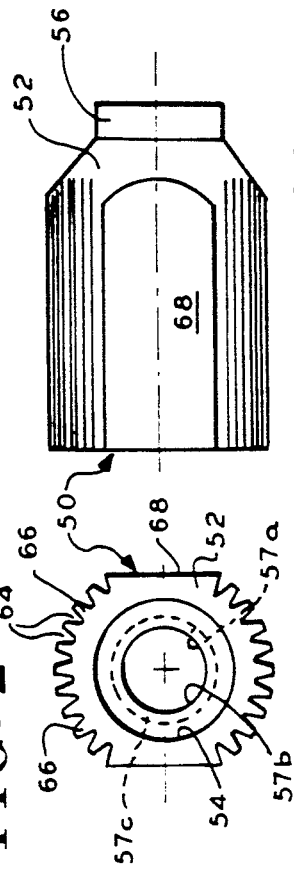
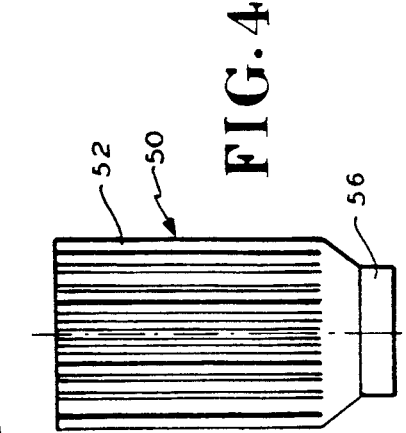
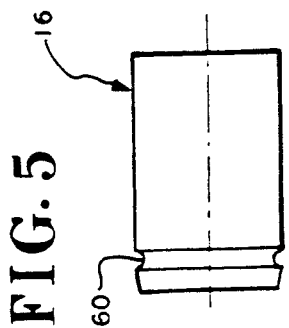

TAMPER INDICATOR FOR A LOCKING SEAL

BACKGROUND OF THE INVENTION

1. Field of the Invention

The present invention is an improvement of the invention set forth in commonly assigned application Ser. No. 528,711, filed May 24, 1990 now U.S. Pat. No. 5,005,883, issued Apr. 9, 1991 and relates to a improved device for indicating that an attempt has been made to tamper with a locking or security seal. More particularly, the present invention relates to an improved device for visually indicating that someone has tampered with or attempted to defeat a locking seal, security seal, or such as intermodal seal, on an ocean container, truck trailer, freight car, equipment cabinet, switch or other item which is intended to be, and to remain, secure.

2. Prior Art

Locking or security seals are used to nominally prevent tampering with, pilferage from, and unauthorized entry to or operation of various items. Such seals are also intended to provide an indication that an unauthorized attempt, successful or otherwise, has been made to enter or operate an item by tampering with or defeating the seal.

The doors of ocean containers, truck trailers, freight cars and equipment cabinets, as well as items such as railway switches and high-voltage switches are often secured with a locking, security or intermodal seal.

Typical seals include a metal male member, which may be a headed rigid bolt, or a flexible cable with a head at one end and a solid tip on the other end, and a metal female member or lock body for receiving the unheaded end of the bolt or the tip of the cable in a passageway thereof. Once the bolt end or tip end is inserted into the passageway, it is retained and restrained therein by appropriate facilities. These facilities may include a circumferential groove near the end of the bolt or tip and a circumferential groove in the wall of the passageway. A locking ring, C-ring or spring ring within the passageway surrounds the bolt or tip end and partially occupies the groove in the bolt or tip as well as the groove in the passageway to interfere with, and prevent, removal of the bolt or cable from the lock body. Other facilities for preventing removal of the bolt from the lock body may include spring-loaded fingers extending into the passageway and engaging notches in the bolt or tip.

Typical locking or security seals are shown and described in the following U.S. Pat. Nos., all but the last being commonly assigned with the present invention: 3,980,337; 4,152,909; 4,193,276; 4,326,740; 4,802,700; and 4,280,726.

To secure a door or other item, the bolt or cable may be inserted through an aperture in a latch, staple, hasp or other locking member in such a way as to interfere with opening, unlocking or operational movement thereof. Thereafter, the bolt or tip is inserted into and retained in the lock body as described above. A padlock or other locking device may be used in conjunction with the locking seal.

A locking or security seal will usually prevent opening of a door or other item when an interloper attempting same is an unsophisticated interloper, such as a vandal, casual thief or other person who does not possess a bolt cutter or other device for cutting the bolt or cable and/or breaking or removing the locking device, if one is used. However, sophisticated interlopers, such as professional thieves and others who possess appropriate tools like bolt cutters, may gain entry simply by cutting the bolt or cable of the seal (and the locking device where one is used). At times the sophisticated interloper may "reassemble" the cut seal by repositioning its now non-integral parts in such a way as to make it appear that defeat thereof and unauthorized entry or operation have not occurred. Another sophisticated approach may involve gross disintegration of one or more parts of the seal followed by replacement thereof with counterfeit parts associated together to mimic an integral, untampered seal.

The sophisticated interloper may also attempt to defeat the locking seal by inserting a shim or the like into the passageway between the end of the bolt or tip and the lock body to remove the ring or the fingers, therewithin from one of the circumferential grooves or notches, thus permitting removal or the bolt or tip end from the lock body. Following unauthorized entry, the locking seal may be reassembled to hide the fact of its defeat.

Thus, a locking or security seal is a physical deterrent, nominal or real, to unauthorized entry or operation in the same manner as a lock. It also serves as a psychological deterrent: interlopers may eschew attempting unauthorized entry which they known will be detected through later visual observation of the breaking of, or tampering-indicating marks on the metal parts of, the seal.

As noted, however, the seal may not successfully deter, physically, psychologically or otherwise, the professional thief or other sophisticated interloper who has the capacity to defeat the seal and to gain unauthorized entry or effect unauthorized operation. Where defeat of the seal is achieved by cutting or other gross disintegration thereof, or where a shim or similar device has been used, a clear indication of tampering is given, unless a successful apparent or actual reassembly has been effected with the original seal's elements or with counterfeits thereof.

It is usually desirable to detect unsuccessful attempts to tamper with or defeat a locking or security seal. For example, if there occur numerous or repeated attempts to gain unauthorized entry or to effect unauthorized operations at a specific location, detection of these attempts permits security or surveillance in such locations to be increased or improved so that the interlopers may be apprehended before they achieve their goal.

It is also desirable to detect successful attempts to tamper with or defeat a seal. Those successful attempts that are not accompanied by apparent or actual reassembly of the seal (or of counterfeit portions thereof), are easily visually detectable by observation of the non-integral seal.

Successful attempts at seal defeat followed by reassembly of the original seal (or its counterfeit) and failure to detect such reassembly are insidious. A theft following defeat of the seal may go undetected for some time, which may prevent identification of the location of the theft and render difficult apprehension of the perpetrators. Even more troublesome is the undetected placement of contraband, such as illicit narcotics, in an otherwise proper shipment of cargo. Moreover, undetected and unauthorized operation of an item following defeat of the seal may lead to untoward events caused by incorrect assumptions concerning the condition of the affected item. For example, an undetected change in the condition of an electrical or railway switch can lead to a catastrophic event.

Due to an unsuccessful attempt to defeat the seal or a successful attempt followed by reassembly of the seal (or its counterfeit), the metal lock body or the metal bolt or cable may bear marks, gouges or nicks giving visual evidence of the attempt. However, such marks may not be easily detected or may be overlooked. Also, the use of non-abrading or protective materials, such as rags or rubber sheets, in conjunction with grasping or holding tools used to defeat the seal may obviate or ameliorate such marks. Further, replacement and apparent reassembly of a defeated seal via the use of umarked counterfeit parts may go undetected.

An object of the invention of commonly assigned application Ser. No. 528,711, filed May 24, 1990 now U.S. Pat. No. 5,005,883, issued Apr. 9, 1991 is the provision of a device which will provide a visual indication of an attempt, successful or unsuccessful, to defeat a locking or security seal. The device of that invention provides this indication regardless of the care used in attempting such defeat, regardless of the techniques employed, and regardless of successful reassembly or counterfeiting of a defeated seal. Specifically, the invention of the '711 application relates to a device for visually indicating that an attempt to tamper with or defeat a locking or security seal has been made. The device is usable with seals which have a lock body, into a passageway of which the end of a male member, such as a bolt or a tip on the end of a cable, is inserted or received. Facilities in the passageway retain, and prevent removal of, the inserted male member. A frangible, brittle shroud is provided which surrounds the lock body. The material and configuration of the shroud are selected so that the application of moderate forces thereto will crack, chip or fracture it. A flange is integral with the shroud. The flange is adapted to surround the male member at its point of entry into the passageway of the lock body. The flange also will crack, chip or fracture when moderate forces are applied to it. Both the shroud and the flange will crack, chip or fracture when moderate grasping, pushing, pulling, or twisting forces are applied thereto. The flange will also crack, chip or fracture when moderate forces are applied thereto by a shim or similar object which is inserted between the flange and the male member in an attempt to insert the object into the passageway to defeat the retention and removal-preventing facilities. The cracking, chipping or fracturing of the shroud and/or the flange provide a visual indication of an attempt, successful or not, to tamper with or defeat the seal whether or not successful defeat is followed by reassembly of the seal.

Preferably, the shroud and the flange of the '711 application are unitarily molded from a frangible, brittle plastic, such as ABS or styrene. In preferred embodiments, the shroud includes a bore adopted to conformally receive the lock body. The ability of the '711 shroud/flange to provide a visual indication of tampering may be enhanced by weaking selected portions thereof, by coating the shroud/flange with a coating of a contrasting color, or by incorporating a visually distinct material into the shroud/flange.

It has been determined that sophisticated interlopers may defeat the purpose of the '711 invention. Specifically, an interloper could defeat a seal of '711 type by cutting the male member. Following this, the interloper could drive the lock body and the portion of the male member still retained therein out of the bore of the shroud. Regardless of what transpired at the site of these occurrences, the interloper would now possess an integral, undamaged shroud/flange. Subsequently, the interloper could defeat a second seal, for example by the use of a shim, and remove its male member from its lock body, which would result in the second shroud/flange becoming disintegral or otherwise possessing evidence of the seal's defeat. Thereafter, following a theft or other mischief, the interloper would discard the damaged second shroud/flange, replace it with the original integral shroud/flange and reassemble the seal.

The present invention prevents the function of the shroud/flange of '711 from being circumvented.

SUMMARY OF THE INVENTION

According to the improved device of the present invention, facilities are provided which respond to an attempt to remove the lock body from the shroud while a portion of the bolt or other male member remains retained in the lock body. The response takes the form of cracking, chipping or fracturing the flange or the shroud when removal is attempted. In specific embodiments of the present invention, the bolt or other male member is decreased in diameter just past its point of entry into the flange and just before its point of entry into the lock body's passageway. The bore of the flange is configured to conform to the male member. Thus the bore of the flange also experiences a diametric decrease between the terminus of the flange and its intersection with the shroud bore in which the lock body is held. These diametric changes result in the flange bore and the male member each having a shoulder. The shoulders abut and interfere with the ability of the lock body which retains a fragment of the bolt being driven out of the shroud bore. This interference results in fracturing or cracking of the shroud/flange should there be an attempt to so drive a male member fragment and the lock body out of the shroud bore.

BRIEF DESCRIPTION OF THE DRAWING

FIG. 1 is a partially sectioned, side elevation of a visual tamper-indicating device utilized with a locking or seal according to present invention;

FIG. 2 is a front elevation of the device according to the present invention;

FIG. 3 is a side elevation of the device shown in FIGS. 1 and 2;

FIG. 4 is a top view of the device according to the present invention; and

FIG. 5 is a side elevation of a lock body, forming a part of the seal with which the device of the present invention is usable.

DETAILED DESCRIPTION

Referring to FIG. 1, there is shown one type of locking or security seal 10 with which a tamper-indicating device 12 according to the present invention is usable. The seal 10, one type of which is more fully described in commonly assigned U.S. Pat. No. 4,802,700, includes a metal bolt 14 and a metal lock body 16.

The bolt 14 comprises an elongated metal shaft 18 carrying an enlarged metal head 20 at one end 18a. The other end 18b of the shaft 18 has formed therein a circumferential groove 22 for a purpose to be described shortly. As described in the '337 patent, the bolt 14 may be replaced by a cable having an enlarged stop member (similar to the head 20) at one end and a tip or stud at the other end, the tip carrying a groove like the groove 22.

Referring to FIGS. 1 and 5, the lock body 16 includes a passageway 24 for receiving the unheaded end 18b of the shaft 18. Formed in the wall of the passageway 24 are one or more circumferential grooves or relieved channels 26, the configuration of which may take the form more fully described in the '700 patent, in commonly assigned U.S. Pat. No. 3,980,337, or in U.S. Pat. No. 4,280,726.

A locking, C-, or spring ring 28 is placed in the groove 22 or in the groove 26. Upon insertion of the end 18b of the shaft 18 into the passageway 24, the ring 28 becomes seated in both grooves 22 and 26. This seating of the ring 28 prevents later withdrawal of the shaft 18 from the passageway 24 to prevent disassociation of the bolt 14 from the lock body 16. A spring-biased-finger-in-notch arrangement may also be utilized, as should be apparent.

The shaft 18 is insertable through the apertures in latches, staples or hasps on doors, switch handles or other items unauthorized entry into which, or unauthorized operation of which, is to be physically or psychologically deterred. Further, if unauthorized entry or operation is attempted or does occur, the seal 10 is intended to give a visual indication thereof. The device 12 of the present invention ensures that such indication is given. In view of the forgoing, both the head 20 and the lock body 16 are sufficiently large to prevent their passage through the apertures in the latches, staples or hasps of the secured item. Also, the distance between the head 20 and the lock body 16 of the assembled seal 10 is such that entry— or operation—permitting movement of the latch, staple or hasp cannot occur without removing or rendering discontinuous the seal 10.

Seals 10 having specific structures different from the seal 10 depicted are shown in the above '337 and '726 patents, as well as in commonly assigned U.S. Pat. Nos. 4,152,909 and 4,193,272. Seals 10 usable with the device 12 of the present invention all include, however, an element similar to the lock body 16 and a male member similar to the end of the bolt 14 which is insertable and held in the lock body 16.

Turning now to FIGS. 1-4, the device 12 of the present invention which is an improvement of the invention of the '711 application may be seen to include a shroud 50. The shroud 50 includes a body 52 containing a bore 54, which is preferably conformal with the lock body 16. The body 52 of the shroud 50 is adopted to surround and envelop those portions of the lock body 16 which may be expected to be grasped, held or otherwise manipulated during an attempt to tamper with or defeat the seal 10. In FIG. 1, the shroud 50 conformally surrounds the lateral portions of the lock body 16 extending parallel to the bolt 14, but this envelopment may be altered so that the entire lock body 16 is surrounded, or to accommodate lock bodies 16 of varying configurations.

The shroud 50 preferably also includes a flange 56, integrally formed with the shroud body 52. A bore 57 within the flange 56 is adapted to closely surround the shaft 18 of the bolt 14 at or near its point of entry into the passageway 24. The bore 57 communicates with the bore 54 of the shroud body 52. The flange 56 may be exteriorly tapered to permit its partial insertion through an aperture in a latch, staple or hasp. The flange 56 occupies a position such that force is applied thereto during certain types of attempts to defeat or tamper with the seal 10. Specifically, the flange 56 covers a portion of the shaft 18 to which grasping or other manipulative forces may be applied in an attempt to remove the bolt 14 from the lock body 16. The flange 56 also receives forces incident to an attempt to insert a shim or similar object between the shaft 18 and the wall of the passageway 24 in attempt to defeat the function of the ring 28. These latter forces will be applied between the shaft 18 and the portion of the bore 54 within the flange 56.

To facilitate assembly of the shroud 50 onto the lock body 16 one or both may include features which trap the two together. These features may take any convenient form. One type of preferred trapping feature comprises a peripheral ridge 58 formed on the wall of the bore 54 and a circumferential groove 60 formed in the lock body 16. When the lock body 16 is inserted a selected distance into the bore 54, the ridge 58 and the groove 60 snap together to hold the lock body 16 within the shroud 50. Continued trapping of the lock body 16 within the shroud 50 is not necessary for the device 12 to perform its function. Specifically, as may be seen in FIG. 1, if, after assembly of the seal 10, the shroud 50 is somehow moved rightwardly relative to or away from the lock body 16, such movement is visually detectable. The shroud 50 cannot be moved leftwardly on the lock body 16 due to the presence of a step 62 in the conformal bore 54 which interferes with the adjacent end of the lock body 16.

In the '711 application the bore 57 of the flange 56 and the portion of the shaft 18 therein are conformally diametrically uniform. A determined and careful interloper could cut the shaft 18 and then drive the shaft remnant and the lock body 16 (leftwardly in FIG. 1) out of the bore 54 in the shroud body 52. The foregoing might be achievable notwithstanding the interference between the ridge 58 and the groove 60. The interloper would thus possess an integral, undamaged shroud/flange 50/56 which could be used to replace the disintegral shroud/flange 50/56 of a subsequently successfully defeated seal 10. The subsequent seal defeat could, thus, be concealed by the use of the cannibalized shroud/flange 50/56.

Thus, according to this invention, the bore 57 has three sections: a larger diameter section 57a at a terminus of the flange 56, a smaller diameter section 57b at the intersection with the bore 54 of the shroud body 52, and a stepped or shoulder-like transition 57c between the bore sections 57a and 57b. The diameter of the shaft 18 is made to be conformal with the bore 57a, 57b, 57c and the shaft 18 thus has a shoulder or step 18c.

An attempt to drive the lock body 16 and a fragment of the shaft 18 out of the bore 54 of the body 52 will be prevented by interference between the shoulders 57c and 18c. A determined attempt will fracture or crack the shroud/flange 50/56. The presence of the shoulders 57c and 18c permits, if desired, the elimination of the ridge 58 and the groove 60. Alternatively, the configuration of the ridge 58 and the groove 60 may be merely such as to make initial assembly of the lock body 16 and the shroud 50 convenient, without relying on these features to prevent removal of the lock body 16 from the shroud 50.

The shroud 50 is fabricated from a frangible, brittle material, such as an ABS or styrene plastic material or any other material which cracks, chips, fractures, breaks or otherwise becomes permanently discontinuous or deformed upon the application thereto of low or moderate forces. Plastics such as ABS and styrene are preferred because they are inexpensive and the shroud 50 may be formed expediently therefrom by a simple molding operation.

When forces are applied to the shroud 50 in an attempt to defeat or tamper with the seal 10, the shroud 50 cracks, chips, breaks or permanently deforms. These forces may be any grasping forces, prying forces, twisting forces, or pulling/pushing forces applied directly to the shroud 50 in an attempt to remove the bolt 14 from the lock body 16, and include forces applied through an abrasion-preventing covering such as a rag or rubber sheet. The forces may also be applied incident to an attempt to insert a shim into the passageway 24, whereupon forces are applied between the shaft 18 and the portion of the bore 54 through the flange 56, as well as attempts to drive the lock body 16 and shaft 18 fragment out of the bore 54. Further, such forces may arise from the application of bending moments transverse to the shaft 18, which effect application of similar transverse forces to the shroud 50, and especially to the flange 56.

The sinuous nature of the interface between the bore 57a, 57b, 57c and the shaft 18, 18c makes shim insertion difficult and increases the chances that attempted insertion will be unsuccessful and/or cracks or fractures the flange 56.

Because the shroud 50 will become discontinuous or permanently deformed upon application thereto of low or moderate forces, attempts to defeat the seal 10 are subsequently easily detectable through visual observation of the concomitant cracking, chipping, breaking or permanent deformation. To further enhance visual observation of such tampering, the frangibility and brittleness of the shroud 50 may be increased by selectively structurally weakening it.

Specifically, as best seen in FIGS. 2–4, the shroud 50 may be weakened by the formation in the exterior thereof of a plurality of grooves 64 which define a plurality of thin, very brittle fins 66 therebetween. As should be obvious, upon the application of very low forces thereto, the fins 66 will break or fracture very easily, enhancing the ability of the shroud 50 to indicate that an attempt to defeat the seal 10 has been made. Other strength-reducing expedients may also be utilized, such as grooves and fins differently oriented or shaped from those shown, projecting members on the shroud 50, and appropriate adjustment of the wall thickness of the body 52 of and the flange 54. Thus, the material of the shroud 50, the wall thickness and other dimensions thereof, and the presence of weakened areas and/or projections are selected and included to ensure that the shroud 50 cracks, chips, breaks or otherwise becomes permanently deformed or damaged when low forces are applied thereto.

As shown in FIGS. 2 and 3, where the grooves and fins 64 and 66 are used, or otherwise, the shroud 50 may include one or more planar regions 68. Indicia, such as codes, serial numbers, logos, trademarks, shippers' names, destination or the like may be imprinted or otherwise placed on these regions 68. The thickness of the shroud 50 beneath the regions 68 may be made sufficiently thin to compensate for the absence of the grooves and fins 64 and 66 thereat.

The manner in which detection of an attempt to defeat the seal 10 will typically occur is visual observation by security personnel or inspectors as they walk or drive therepast. To negate the observation-impeding effects of the distance between such an observer and the seal 10, or of low-light or other inhibitory conditions, the visibility of any cracking, chipping, breaking or deformation may be enhanced.

Specifically, the shroud 50 may contain a coating on the exterior thereof. Preferably, the coating has a color which sharply contrasts with the natural color of the material of the shroud 50. When the shroud 50 is cracked, chipped, broken or deformed, one or more portions of the exterior or interior of the shroud 50 are exposed at the locations where the coating is removed or rendered discontinuous. This exposure and the resultant contrasting two-color pattern effected thereby is quite easily discernable from a distance.

Moreover, a material may be incorporated into the shroud 50 in such a way as to be normally hidden and not visually detectable from the exterior of the shroud 50. Cracking, chipping or breaking of the shroud 50 will render the material observable. If the material is a colorant, the color of which sharply contrasts with the color of the exterior of the shroud 50, visible detection of an attempt to defeat the seal 10 is provided. Nighttime detection of attempts to defeat the seal 10 may be enhanced by selecting the incorporated material to be light reflective. Directing a beam of light onto the shroud 50 following an attempt to defeat the seal 10 which has cracked, chipped or broken the shroud 50 will result in light being reflected back from the normally obscured reflective material.

The shroud 50 may be manufactured and sold separately as such, with or without accompanying seals 10, unassembled therewith, to users of the seal 10 for later field assembly of the shrouds 50 onto lock bodies 16. A manufacturer of the shroud 50 may also preassemble the shrouds 50 onto lock bodies 16 before selling the seals 10. Either the shroud 50 manufacturer, the vendor of the seals 10 or the end user may place appropriate indicia on the regions 68.

In an alternative embodiment the use of the shroud 50 permits a modification of the typical bolt 14 which hinders, and results in a visible indication of, an attempt to use a shim or the like to defeat the seal 10 by removal of the ring 28 from one of the grooves 22 or 26. Specifically, and referring to FIG. 1, the bolt 14 may include on its shaft 18 an enlargement 80. The enlargement 80 may comprise an annular collar 80a formed integrally with the shaft 18 a step-like diametric increase in the shaft 18 to, or one or more protruding fin-like members formed on the shaft 18, as by a cold-heading operation following formation of the shaft 18. With the bolt end 18b fully inserted into and retained by the lock body 16, the collar 80a is located immediately adjacent, or is closely from, the end of the flange 56.

The collar 80a is configured and dimensioned to interfere with the insertion of a shim or similar object between the wall of the bore 54 and the surface of the shaft 18. Determined attempts to so insert the shim will result in cracking, chipping or breaking of the brittle flange 56 an increase in the diameter of the shaft 18 functions in a manner similar to the collar 80a.

If the enlargement 80 comprises one or more fin-like members formed by cold-heading the shaft 18, these are preferably oriented parallel to the axis of the shaft 18. This orientation ensures that forces applied to the bolt 14 in an attempt to force it into the lock body 16 crack or split the flange 56. Fins on the shaft 18 also interfere with movement of a shim thereabout in an attempt to defeat the retaining function of the ring 28.

While the use of the enlargement 80 may be desired, such can be foregone where the bore 57a, 57b, 57c and the shaft 18, 18c are used. The formation of the enlargement 80 is more costly than the formation of the bore 57a, 57b, 57c and shaft 18, 18c.

The coatings on, or materials included in, the shroud 50 render it difficult to counterfeit. A successful attempt to counterfeit the shroud 50 requires both plastic molding equipment and the use of such coatings or included materials. Counterfeiting may also be further obviated by fabricating the shroud 50 from mottled, marbled or multi-colored plastics, or from plastics having other unusual surface or interior properties. The unique visual characteristics of such plastics are difficult to reproduce, thus obviating attempts to counterfeit the shroud 50.

Other modifications and changes to the foregoing invention, which is defined in the following claims, will be obvious to those skilled in the art.

What is claimed is:

1. An improved device for visually indicating an attempt to tamper with or defeat a locking seal; the seal being of the type having a body which receives and prevents the removal therefrom of an inserted member; the device having a frangible, brittle shroud adapted to overlie the body; the device also having a frangible, brittle flange on the shroud and adapted to overlie portions of the member at or near its point of reception in the body, the shroud and the flange cracking, chipping or fracturing upon the application of low force to the exterior of either thereof or between the flange and the member during an attempt to tamper with or defeat the seal; wherein the improvement comprises:
   means responsive to an attempt to remove the body from the shroud while the portion of the member which the flange overlies is retained in the body for cracking, chipping or fracturing the flange or the shroud.

2. An improved device as in claim 1, wherein:
   the cracking, chipping and fracturing means comprises:
   a first surface feature on the member between its point of entry into the body and its point of entry into the flange, and a second surface feature within the flange which interferes with the first surface feature.

3. An improved device for visually indicating an attempt to tamper with or defeat a locking seal, the locking seal being of the type having a lock body which receives an inserted bolt end and within the lock body for preventing removal of the inserted bolt end; the device having a frangible, brittle shroud adapted to surround the lock body; the device also having a frangible, brittle flange integral with the shroud and having a bore adapted to surround the bolt at its point of entry of its end into the lock body, the shroud and the flange cracking, chipping or fracturing upon the application of low force to the exterior of either thereof or between the flange and the bolt during an attempt to tamper with or defeat the seal by removing the bolt from the lock body or by inserting a removal-preventing-means-defeating object into the passageway; cracking, chipping or fracturing of the shroud or the flange providing a visual indication of an attempt to tamper with or defeat the seal; wherein the improvement comprises:
   means responsive to an attempt to disassociate the lock body and the shroud while the end of the portion of the bolt which is surrounded by the flange is retained in the lock body for cracking, chipping or fracturing the flange or the shroud.

4. An improved device as in claim 3, wherein:
   the cracking, chipping and fracturing means comprises:
   a first surface feature on the region of the bolt adapted to be surrounded by the flange while the bolt end is retained in the lock body, and
   a second surface feature on the bore of the flange which interferes with the first surface feature.

5. An improved device as in claim 4, wherein:
   the first surface feature is the result of a diametric decrease of the bolt as viewed from its point of entry into the flange toward its end, and
   the second surface feature is the result of a diametric decrease of the flange bore as viewed from the point of entry of the bolt thereinto toward the shroud.

6. An improved device as in claim 5, wherein:
   the surface features are shoulders resulting from the diametric decreases.

7. The device of claim 3, wherein:
   the shroud and the flange are unitarily formed from a frangible, brittle material.

8. The device of claim 7, wherein:
   the shroud and the flange are molded plastic.

9. The device of claim 8, wherein:
   the shroud and the flange are ABS or styrene.

10. The device of claim 3, which further comprises:
    a weakened area on the exterior of the shroud which increases the frangibility and brittleness thereof.

11. The device of claim 10, wherein:
    the weakened area comprises:
    a plurality of adjacent grooves formed in the exterior of the shroud, which grooves define therebetween a plurality of brittle fins.

12. The device of claim 11, wherein:
    the depth of the grooves is such that the frangibility and brittleness of the underlying portions of the shroud are increased.

13. The device of claim 11, which further comprises:
    a generally planar area on the exterior of the shroud, the planar area being adapted to receive printed indicia.

14. The device of claim 3, which further comprises:
    a coating on the exterior and normally obscuring selected portions of the surface, of the shroud, the coating having a color which contrasts with the color of the underlying shroud such that cracking, chipping or fracturing of the shroud removes or renders discontinuous the coating so that some of the formerly obscured shroud surface portions are visually discernable at the location of such cracks, chips or fractures to thereby provide a visual indication of an attempt to tamper with or defeat the locking seal.

15. The device of claim 3, which further comprises:
    a material incorporated in, and normally visually obscured from the exterior of, the shroud, cracking, chipping or fracturing of the shroud exposing and rendering visible thereat the material to thereby provide a visual indication of an attempt to tamper with or defeat the locking seal.

16. The device of claim 15, wherein:
    the material is a colorant, the color of which upon exposure thereof sharply contrasts with the color of the shroud.

17. The device of claim 15, wherein:

the material is light-reflective so that following an attempt to tamper with or defeat the locking seal, light from a remote source is reflected from the exposed material to give a visual indication of such attempt.

18. The device of claim 3, wherein:
the plastic has a surface or interior color, texture, appearance or other characteristic which is visually notable, the characteristic rendering the shroud difficult to counterfeit.

19. The device of claim 3, which further comprises:
means on the surface of or included within the interior of the shroud and/or the flange for accentuating the visual observability of any cracks in, chipping of or fracturing of the shroud and/or the flange.

* * * * *